May 13, 1952 A. C. MACBETH 2,596,264
INSTRUMENT FOR MEASURING PUPILLARY DISTANCES
Filed June 4, 1946 2 SHEETS—SHEET 2

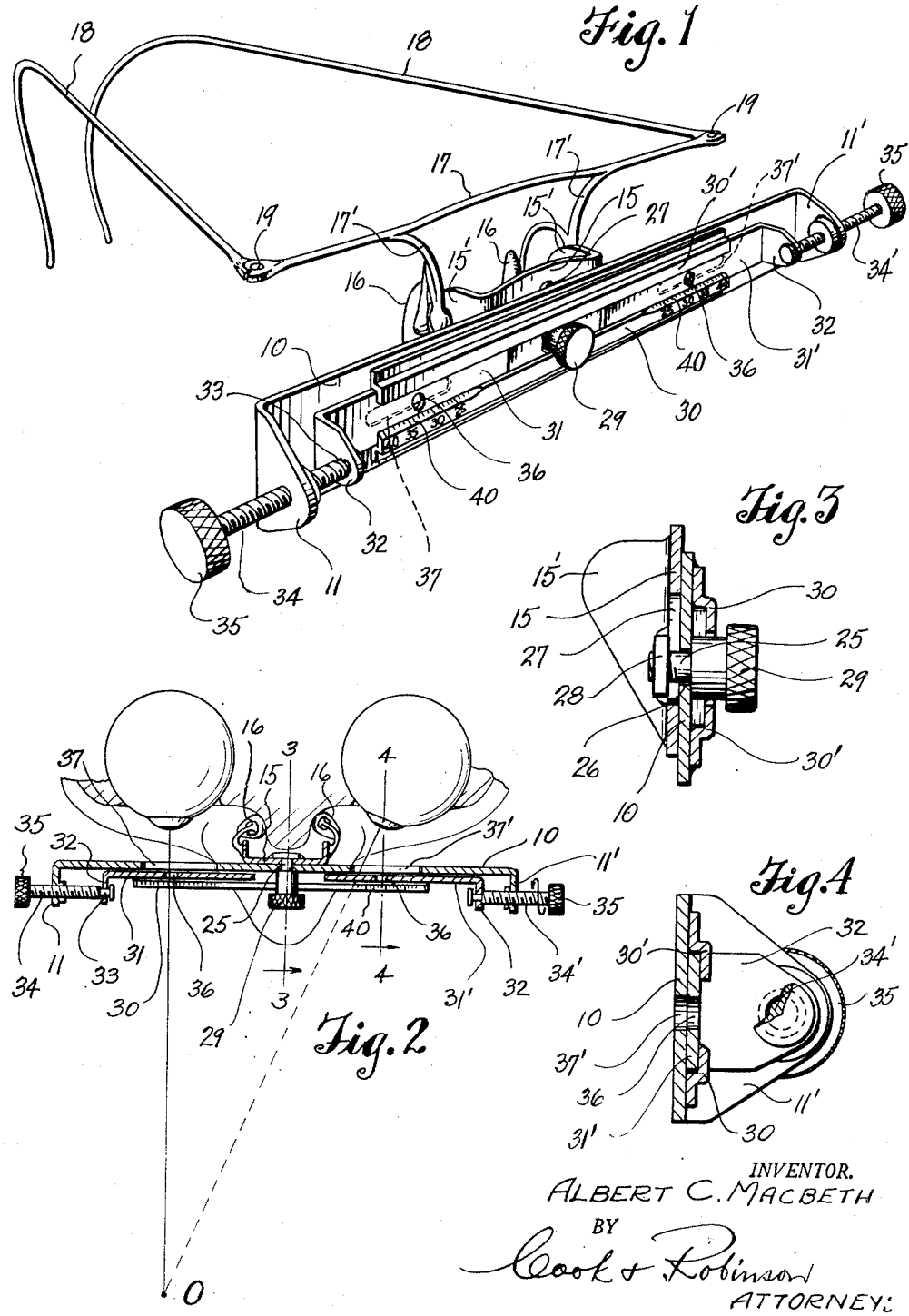

INVENTOR.
ALBERT C. MACBETH
BY
Cook & Robinson
ATTORNEYS

Patented May 13, 1952

2,596,264

UNITED STATES PATENT OFFICE 2,596,264

INSTRUMENT FOR MEASURING PUPILLARY DISTANCES

Albert C. Macbeth, Seattle, Wash.

Application June 4, 1946, Serial No. 674,291

1 Claim. (Cl. 33—200)

This invention relates to measuring instruments designed for use in determining certain distances pertaining to spacing and alinement of any person's eyes, that are required or desired in the making of spectacles for that person.

More specifically stated, the present invention pertains to improvements in instruments for measuring the distance between the pupils of the eyes, referred to in the art as the "pupillary distance," to be used in determining the correct spacing of optical centers of the lenses of spectacles for any particular person for any specified focal distance. Furthermore, to provide such an instrument that in addition to its use of measuring pupillary distances, may be used for determining the extent of any discrepancy as between the elevation of the individual's eyes and also to determine difference in spacing of the two eyes relative to the nose.

It is well understood that in the making of a pair of spectacles for any individual, the lenses may be ground to a prescription that will cause the vision to be focused for distant vision or they may be ground to a prescription that will focus the vision at any shorter distance; for example, at a normal reading distance. Also, it is quite common for spectacles to be equipped with bifocal, or tri-focal lenses, and in such cases, the optical centers of the lens segments for close vision should be closer together than those for distant vision.

It is very essential to best vision, that the optical centers for any specified focal distance be correct due to the prismatic effects if optical centers are not exactly in the lines of vision of the two eyes.

Another point of consideration is that nearly all persons have a "master eye" that normally looks directly at the object viewed while the other eye adjusts itself to the proper angle for seeing the object, and therefore it is not the best technique in the spacing of lenses, to assume that their optical centers should be de-centered to the same distance, but rather that the de-centering should be in accordance with the determination of which of the two eyes is the master eye.

In view of the foregoing, it has been the principal object of this invention to provide an instrument for accurately measuring pupillary distances as a means for determining the proper spacing of the lenses of spectacles so that their optical centers will coincide with the lines of vision of the two eyes when focused on an object at any given distance; for example, at a reading distance, or when focused for distant vision.

It is also an object of the invention to provide an instrument for measuring pupillary distances and also for accurately determining the distance for de-centering the individual lenses to bring their optical centers in exact registration with the lines of vision of the corresponding eyes for any specific distance, taking into consideration the possibility of difference in angular position of the two eyes in looking at an object due to the person's master eye tending to look more directly at the object than the other eye.

It is also an object of this invention to provide an instrument whereby pupillary distances may be easily, quickly and accurately measured to aid in an exact location of the optical centers of lenses of spectacles to best suit the facial characteristics of the particular individual for whom the spectacles are to be made.

Still further objects of the invention reside in the details of construction and combination of parts embodying the instrument and its mode of use, as will hereinafter be fully described.

In accomplishing the above mentioned and other objects of the invention, I have provided the improved details of construction, the preferred forms of which are illustrated in the accompanying drawings, wherein—

Fig. 1 is a perspective view of an instrument of a preferred form of construction, for taking measurements in accordance with the objects of the present invention.

Fig. 2 is a horizontal section of the same, illustrating, in a diagrammatic manner, the use of the instrument for determining the spacing of optical centers of lenses to accommodate the eyes for a specified focal distance.

Fig. 3 is a cross section taken on the line 3—3 in Fig. 2.

Fig. 4 is a cross section taken on line 4—4 in Fig. 2.

Figure 5:
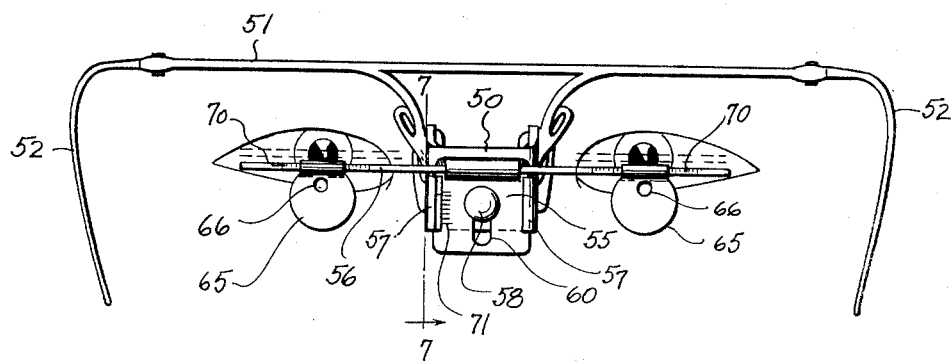
Fig. 5 is a front view of a measuring instrument of an alternative form of construction for accomplishing the objects of the present invention.
Figure 6:
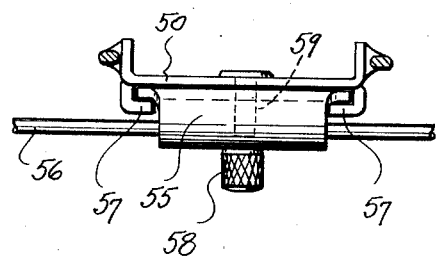
Fig. 6 is a top view of a part of the nose piece of the same.
Figure 7:
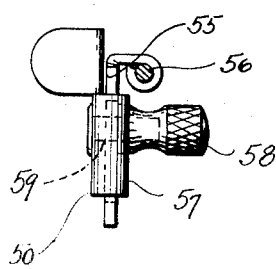
Fig. 7 is a section taken on line 7—7 in Fig. 5.
Figure 8:
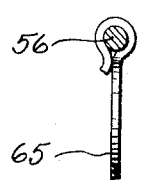
Fig. 8 is an end view of the frame member.

Referring more in detail to the drawings—

First, with reference to the instrument of Figs. 1 to 4 inclusive: The instrument is designed to be placed for use upon the bridge of the nose of the person to be fitted with the spectacles after the fashion of supporting the ordinary pair of spectacles thereon, and it comprises a straight, flat strip 10 of metal or other suitable material, disposed horizontally and vertically edgewise, and having its opposite end portions turned directly forward, forming ears 11 and 11' for the reception of adjusting screws as presently will be described.

Adjustably fixed to the back side of the bar 10, midway of its opposite ends, is a plate 15 with back-turned wings 15' at its lateral edges to which a pair of nose pads 16 and 16 are fixed in spaced position to engage against opposite sides of the bridge of the nose, as shown in Fig. 2, and also to which plate 15 a horizontal cross bar 17 is fixed by legs 17'—17' to secure the bar 17 rigidly to the plate 15. At its ends, the cross bar 17 has temples 18—18 hingedly fixed thereto, as at 19, and these temples are adapted to hook over the ears of the person being measured to hold the instrument properly in place while the measurements are being taken.

By reference to Fig. 3, it will be understood that the plate 15 is pivotally affixed to the cross bar 10 by a bolt 25 that extends rotatably through a hole 26 in the bar 10 and through a vertical slot 27 in the plate 15. A nut 28 is threaded onto the inner end of the bolt against the plate and on the outer end of the bolt is a knurled head 29 whereby the bolt may be turned and tightened to clamp the parts 10 and 15 together. This form of connection permits the bar 10 to be raised or lowered on the plate 15, and also to be tilted laterally as may be required to aline it exactly with the level of the wearer's eyes regardless of whether or not they are exactly at the same level.

Mounted lengthwise of the bar 10, in parallel relationship and in vertical spacing, are two flanged bars 30 and 30' between which a pair of aperture plates 31 and 31' are slidably contained for endwise, horizontal adjustment. Each plate is formed at its outer end with an out-turned ear 32. Adjustment of these aperture plates is made by means of adjusting screws 34 and 34' which are threaded through the out-turned ears 11 and 11' of the bar 10 and which have their inner ends rotatably fixed as at 33 in the ears 32. At their outer ends, the screws 34 and 34' have knurled heads 35 for easy turning, and it will be understood that by turning a screw in one direction or the other, the corresponding aperture plate will be adjusted inwardly or outwardly along bar 10 accordingly.

Each aperture plate 31 and 31' is formed with a small sight aperture 36 and these maintain registration with horizontal slots 37 and 37' in the bar 10, as will be understood best by reference to Fig. 2.

Formed on the top edge portion of the flange member 30, along its opposite end portions, are graduated scales 40 by which the exact distances of the apertures 36 from the frame center may be determined. Preferably the scales are graduated in millimeters.

To use this device for measuring the pupillary distances for use in placing optical centers of paired lenses for any given focal distance, the instrument is placed in position on the nose of the person to be fitted and secured by applying the temples over the patient's ears. Then a preliminary reading is made in which the two aperture plates 31 and 31' are so adjusted that upon looking through the apertures 36 therein, an object at a given distance will be clearly visible to either eye without movement of the head, and the plate apertures will, to the patient, appear to be in exact registration. The total distance between apertures 36 of the aperture plate is then noted by reference to the graduated scales 40 on the flange member 30. For example, one scale may show a reading of 34 mm. and the other may show a reading of 32 mm., giving a total of 66 mm.; this being the pupillary distance for that focal distance.

Where a certain prismatic effect is desired, for correction of lines of vision, the optical centers may be moved accordingly in relationship to the exact pupillary distances as determined by the individual readings of the aperture plates.

Some technicians disregard the "master eye" phase of vision and equally divide the total pupillary distance for the location of the optical centers of the two lenses. If, however, it has been determined, by means not involved in this invention, which of the patient's eyes is the master eye, the aperture plate corresponding to that particular eye is adjusted to show a spacing of its aperture a distance of one-half the total; that is, for the above reading, 33 mm. from the frame center, provided the patient's nose is centrally located between the eyes. Then a final or second reading is taken in which the adjusting screw of the aperture plate corresponding to the other eye is adjusted so that the object at the same distance will again be clearly seen by either eye looking through both aperture plates and both apertures will appear to the patient to register accurately with each other.

The reading of the settings of the aperture plates will then indicate, respectively, the exact distances of the optical centers from the frame center for the corresponding lenses.

If the patient is to be fitted with bifocal or tri-focal lenses, the measurements for the other distances are made in the same manner as the above-mentioned second reading, leaving the adjustment of the aperture plate for the master eye in its original 33 mm. setting for all focal distances.

If, upon inspection of the patient's facial construction, it should be noted that one eye is higher than the other, then the lock bolt 25 is loosened by turning the head 29 and the bar 10 is tilted to the level required to bring the aperture line to the same inclination as the pupil line. Also, vertical adjustment of the bar 10 may be made to place the apertures at the elevation required for best results in taking the desired measurements.

Referring now to the device of modified form shown in Figs. 5, 6, 7 and 8:

This device is designed for the same purposes of that above described. It comprises a nose piece 50 similar to the piece 15 of the device previously described and fixed in a like manner to a cross bar 51, which, at its ends, has temples 52—52 hingedly attached thereto. Vertically adjustable on the nose plate is a mounting 55 in which a horizontal cross rod 56 is fixed. The mounting 55 is slidably held within vertically extending and inturned guide flanges 57—57 on the piece 50; and it may be locked at a set position of its vertical adjustment by a lock nut 58 threaded on a stud 59 that extends through the nose plate and through a vertical slot 60 in plate 55. Adjustable along the outer end portions of the cross rod 56 are small circular disks 65—65 that depend from the rod in its vertical plane, and by which the vision of the wearer of the instrument may be obstructed. Each disk is formed with a small aperture 66 through which the wearer may look at a designated object for making a measurement.

The opposite end portions of the rod 56 are graduated and marked as indicated at 70, and thus the distance of a disk aperture from the frame center may be determined. Also, it is shown that plate 55 is formed along one edge with a graduated scale, as at 71, by which vertical adjustment of this plate may be determined with respect to a line or point on plate 50.

In using this device to determine if and to what extent the eyes are out of level, the frame is first placed properly on the patient's nose and the temples 52 applied over the ears to hold it in place. Then the lock nut 58 is loosened and the cross rod 56 is brought to the level of one eye and a reading on the plate scale 71 is made. Then the rod is leveled up with the other eye, and a similar plate reading taken. If both readings are the same, the eyes are considered level, but if the readings are different, then the indicated necessary correction is made in placing the lenses in the spectacles, to bring the optical centers to levels corresponding to the levels of the eyes of the person who will wear the spectacles.

To measure pupillary distance for spacing of optical centers of lenses, the same procedure is followed as that followed in use of the device of Fig. 1; the disks 65 being adjusted in or out on the rod 56 to permit focusing each eye on the same object at any specified distance.

Primarily, the devices of Figs. 1 and 5 are for measuring pupillary distances, and these measurements can be divided, by reference to the graduated scales to give exact distances for setting each lens, taking into consideration correction that may be desired for various reasons.

Having thus described my invention, what I claim as new therein and desire to secure by Letters Patent is:

An instrument for measuring pupillary distances comprising a frame equipped with temples for the functional mounting of the instrument at spectacle distance before the eyes of the person to be measured, and with a nose piece for anatomically centering it relative to the nose; said frame including a rigid, continuous cross-plate with elongated, horizontally directed sight openings therein directly before the eyes and out-turned ears at its ends, flanged guide bars fixed longitudinally to the cross-plate above and below the sight openings, aperture plates slidably fitted between the guide bars on the cross-plate and overlying said sight openings, each aperture plate being independently adjustable relative to the other from and toward the anatomical center of the frame and each having a sight aperture therein that is maintained within the limits of its corresponding cross-plate opening, and through which apertures the vision of the two eyes may be focused on an object at any focal distance, each aperture plate having an out-turned ear at its outer end, adjusting screws threaded through the ears of the cross-plate and rotatably fixed at their inner ends to the ears of the corresponding aperture plates for their adjustment, graduated scales on the frame and reference marks on the aperture plates for indicating on the corresponding scales the distance of each aperture from the anatomical center of the frame for any focal adjustment.

ALBERT C. MACBETH.

REFERENCES CITED

The following references are of record in the file of this patent:

UNITED STATES PATENTS

| Number | Name | Date |
| --- | --- | --- |
| 339,676 | Miles | Apr. 13, 1886 |
| 437,030 | Hinden | Sept. 23, 1890 |
| 505,496 | Ward | Sept. 26, 1893 |
| 638,727 | Lauch | Dec. 12, 1899 |
| 716,516 | Boothroyd | Dec. 23, 1902 |
| 1,487,011 | Brown | Mar. 18, 1924 |
| 1,935,175 | Clement | Nov. 14, 1933 |
| 2,197,139 | Warner | Apr. 16, 1940 |